United States Patent
Brenner et al.

(10) Patent No.: US 10,573,924 B2
(45) Date of Patent: Feb. 25, 2020

(54) ELECTROCHEMICAL CELL

(71) Applicant: VARTA Microbattery GmbH, Ellwangen Jagst (DE)

(72) Inventors: Rolf Brenner, Ellwangen Jagst (DE); Juergen Ernsperger, Neuler (DE); Claus-Christian Fischer, Ellwangen Jagst (DE); Winfried Gaugler, Ellwangen Jagst (DE); Rainer Hald, Ellwangen Jagst (DE); Goran Kilibarda, Schwaebisch Gmuend (DE); Bernd Kreidler, Ellwangen Jagst (DE)

(73) Assignee: VARTA Microbattery GmbH, Ellwangen Jagst (DE)

( * ) Notice: Subject to any disclaimer, the term of this patent is extended or adjusted under 35 U.S.C. 154(b) by 0 days.

(21) Appl. No.: 15/623,438

(22) Filed: Jun. 15, 2017

(65) Prior Publication Data
US 2018/0069261 A1 Mar. 8, 2018

(30) Foreign Application Priority Data

Jul. 26, 2016 (EP) .................................... 16181222

(51) Int. Cl.
*H01M 10/0525* (2010.01)
*C08G 65/40* (2006.01)
(Continued)

(52) U.S. Cl.
CPC .... *H01M 10/0525* (2013.01); *C08G 65/4012* (2013.01); *H01M 2/022* (2013.01); *H01M 2/0222* (2013.01); *H01M 2/0277* (2013.01); *H01M 2/0404* (2013.01); *H01M 4/045* (2013.01); *H01M 10/056* (2013.01); *H01M 2/046* (2013.01); *H01M 2/0465* (2013.01);
(Continued)

(58) Field of Classification Search
CPC combination set(s) only.
See application file for complete search history.

(56) References Cited

U.S. PATENT DOCUMENTS 8,394,522 B2* 3/2013 Snyder ................ H01M 2/0207
429/129
2006/0093898 A1* 5/2006 Kwak ................. H01M 2/0202
429/94

(Continued)

FOREIGN PATENT DOCUMENTS

CN 1945890 A 4/2007
CN 201918433 U 8/2011
(Continued)

OTHER PUBLICATIONS

European Search Report dated Sep. 22, 2016 in corresponding European Patent Application No. 16181222.7.
(Continued)

*Primary Examiner* — Kaity V Chandler
(74) *Attorney, Agent, or Firm* — DLA Piper LLP (US)

(57) ABSTRACT

An electrochemical cell includes a composite electrode body with at least one positive and at least one negative electrode; an electrolyte that impregnates the composite electrode body; and a housing with a liquid-impervious interior, wherein the composite electrode body impregnated with the electrolyte is disposed in the interior, and the housing consists of PEK or a PEK based material.

5 Claims, 2 Drawing Sheets

(51) Int. Cl.
*H01M 10/056* (2010.01)
*H01M 4/04* (2006.01)
*H01M 2/02* (2006.01)
*H01M 2/04* (2006.01)
*H01M 10/0587* (2010.01)

(52) U.S. Cl.
CPC ...... *H01M 2/0482* (2013.01); *H01M 10/0587* (2013.01)

(56) References Cited

U.S. PATENT DOCUMENTS

| | | | |
|---|---|---|---|
| 2010/0279162 A1 | 11/2010 | Chun | |
| 2014/0120413 A1 | 5/2014 | Nielsen | |
| 2014/0302368 A1* | 10/2014 | Wang | H01M 2/0242 429/99 |
| 2015/0086868 A1* | 3/2015 | Inoue | H01M 10/052 429/212 |
| 2015/0118533 A1* | 4/2015 | Yi | H01M 2/0404 429/94 |
| 2015/0140366 A1* | 5/2015 | Nicholls | H01M 10/5016 429/50 |
| 2015/0140400 A1* | 5/2015 | Yamazaki | H01M 10/0585 429/136 |
| 2015/0279577 A1* | 10/2015 | Uchida | H01M 10/0569 429/336 |
| 2015/0280209 A1* | 10/2015 | Ohara | H01M 10/0587 429/94 |

FOREIGN PATENT DOCUMENTS

| | | |
|---|---|---|
| EP | 2 367 218 A1 | 9/2011 |
| JP | 2004-6157 A | 1/2004 |
| JP | 2010-113963 A | 5/2010 |
| WO | 2010/089152 A1 | 8/2010 |
| WO | 2010/146154 A2 | 12/2010 |

OTHER PUBLICATIONS

First Office Action dated May 13, 2019 of counterpart Chinese Application No. 201710617186.9, along with an English translation.

\* cited by examiner

ELECTROCHEMICAL CELL

TECHNICAL FIELD

This disclosure relates to an electrochemical cell.

BACKGROUND

Particularly well-known examples of electrochemical cells are button cells and round cells. Button cells usually have a cylindrical housing, the height of which is equal to or less than its diameter. In round cells, the housing is likewise cylindrical, but its height exceeds its diameter.

It is possible for very different electrochemical systems to be present in the housings. Very widespread cells are those based on zinc/air, zinc/$MnO_2$ and nickel/zinc. Secondary (rechargeable) systems are also widespread. Examples of these are nickel/metal hydride cells, nickel/cadmium cells and lithium ion cells.

The cylindrical housing of round cells and button cells conventionally consists, in general, of two solid, usually metallic housing parts, between which there is arranged an electrically insulating seal. One of the housing parts electrically connects to the positive electrode and has correspondingly positive polarity. The other electrically connects to the negative electrode and has correspondingly negative polarity. The seal is intended to prevent electrical contact between the housing parts having opposite polarity. Furthermore, it is intended to counteract escape of liquid and moisture from the housing and penetration thereof into the housing.

The use of metallic housings is associated with various disadvantages. They are produced by a complex deep drawing method, and corrosive attack on the housing by the electrolyte or by other corrosive substances formed in the charging and discharging operation can never be entirely ruled out in spite of specific precautions.

SUMMARY

We provide an electrochemical cell including a composite electrode body with at least one positive and at least one negative electrode; an electrolyte that impregnates the composite electrode body; and a housing with a liquid-impervious interior, wherein the composite electrode body impregnated with the electrolyte is disposed in the interior, and the housing consists of PEK or a PEK based material.

DETAILED DESCRIPTION

Figure 1A:
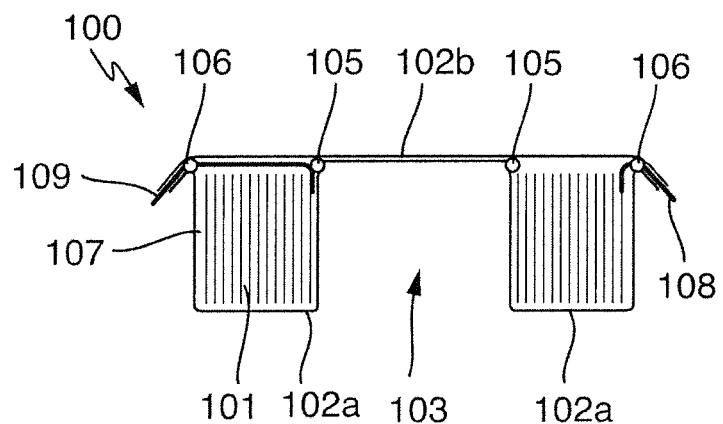
FIG. 1A is a schematic cross-sectional view of an electrochemical cell.

It will be appreciated that the following description is intended to refer to specific examples of structure selected for illustration in the drawings and is not intended to define or limit the disclosure, other than in the appended claims.

We provide an electrochemical cell that includes the following features:

It comprises a composite electrode body having at least one positive and at least one negative electrode: in such a composite body, the at least one positive electrode and the at least one negative electrode are bonded to one another in a fixed manner, usually via lamination or adhesive bonding. There is usually a separator arranged between electrodes of opposite polarity, which may be a porous polymer film, for example, of a polyolefin.

Wound composite electrode bodies are known. Button cells having wound composite electrode bodies are described, for example, in WO 2010/146154 A2 and in WO 2010/089152 A1. The composite electrode bodies described therein can also be used as a cell herein.

For production of such wound composite electrode bodies, a single cell in tape form is produced in a first step. For this purpose, positive electrodes in tape form and negative electrodes in tape form are combined with one another and with one or more separators in tape form. The electrodes can, for example, be laminated on opposite sides of a separator. The single cell in tape form thus produced is then fed to a winding apparatus and processed therein to give the wound composite electrode body. For this purpose, the single cell is typically wound on a winding spindle or a winding core. After a usually predefined number of windings (a winding is understood here to mean each complete revolution of the composite around the winding spindle or winding core), the winding operation is stopped. The wound composite body formed is separated, for example, by a cutting or punching tool, from the immediately following, as yet unwound section of the single cell.

The composite electrode body has been impregnated with an electrolyte: the choice of electrolyte depends on which electrochemical system is being chosen for the cell. If the cell is a nickel/metal hydride cell, the electrolyte is an alkali. If the cell is a lithium ion cell, the electrolyte is generally composed of a mixture of organic carbonates with a conductive lithium salt dissolved therein.

It comprises a housing with a liquid-impervious interior: as in conventional cells, the primary function of the housing is to prevent escape of liquid (electrolyte) from the housing and penetration of moisture out of and into the housing.

The composite electrode body impregnated with the electrolyte is disposed in the interior: the aim is generally for the composite electrode body to fill the interior with maximum efficiency. Any dead volume in the interior has an adverse effect on the energy density.

It is a particular feature that the housing consists of PEK (polyether ketone) or a PEK based material. As is well known, polyether ketones are thermoplastics of high thermal stability. The most commonly used polyether ketones are polyaryl ether ketones (PAEK for short). One of the most well-known and important representatives of PEKs is PEEK (polyether ether ketone). More preferably, the housing of the cell consists of PEEK or a PEEK based material.

A PEK based material consists at least partially of PEK. Similarly, a PEEK based material is a material consisting of at least partially of PEEK. A PEK or PEEK based material may contain (in addition to PEK or PEEK) other components, for example, inorganic or organic fillers and/or pigments. However, it is preferred that PEK or PEEK is always present in the materials in an amount of at least 20% by weight. Preferably PEK or PEEK are the main components of the PEK/PEEK based materials.

The melting temperature of PEEK is about 335° C. to 345° C. There are various derivatives (e.g., PEEEK (poly (ether ether ether ketone)) and PEKK (poly(ether ketone ketone))), which have slightly different melting points (e.g., PEKK about 391° C. or PEEEK about 324° C.). All these derivatives are suitable as housing materials for the cell.

Polyether ketones are stable to almost all organic and inorganic chemicals. They are sensitive only to UV radiation and to strongly acidic and oxidizing conditions, but these are generally not encountered in batteries.

The use of PEK as housing material brings various advantages. Being a thermoplastic, PEK is very much easier to process and form than metallic materials. It is very substantially inert with respect to corrosive substances that are customary in electrochemical cells. Being an electrical insulator, it minimizes the opportunities for short circuits across the housing. Furthermore, it has a very much lower density than metallic housing materials. Given the same housing thickness, the use of PEK gives rise to distinct weight advantages.

It is preferable that the cell is notable for at least one of the following additional features:

Preferably, the housing comprises two housing parts together forming the interior of the housing.

The two housing parts preferably consist of PEEK films. These preferably have a thickness of 50 μm to 500 μm. Within this range, preference is further given to a thickness of 100 μm to 300 μm.

The housing parts can be bonded to one another by an adhesive or else by welding. Correspondingly, the housing parts, in preferred examples, are joined to one another via at least one welded or bonded seam.

Joining of the housing parts by welding is preferable in principle. Housing parts, especially housing films, of PEK can be welded to one another without difficulty, for example, by a laser.

Thermoplastics such as PEK absorb just a small proportion of the laser radiation from solid-state lasers in their standard wavelength ranges of 800 to 1100 nm. So that these thermoplastics can be efficiently melted and welded by a laser radiation, it is possible to add additives that improve the absorption properties thereof. Suitable for this purpose are all inorganic or organic color pigments that absorb the radiation from solid-state lasers within the stated wavelength range, for example, carbon black.

The housing parts can be bonded, for example, by a hotmelt adhesive or a chemically setting adhesive. Suitable examples are polyimide adhesive tapes, polyethylene or polypropylene sealing films, epoxy resin or polyurethane.

Further preferably, the composite electrode body comprises:

at least one output conductor electrically connected to the at least one positive electrode of the composite electrode body and/or at least one output conductor electrically connected to the at least one negative electrode of the composite electrode body.

Preferably, the output conductor(s) is/are guided out of the interior of the housing to the outside, especially between the two housing parts.

Particularly preferably, the housing has at least two spatially separate welded or bonded seams, it being preferable that the welded or bonded seams each have a ring-shaped profile.

This is especially when the cell has at least one of the following additional features:

When the above-described composite electrode body is ring-shaped.

When the liquid-impervious interior is ring-shaped and arranged around a central through-hole or recess.

When the ring-shaped composite electrode body is arranged within the ring-shaped interior.

Housings of conventional round cells and button cells are cylindrical. They do not have a central through-hole or recess.

As described at the outset, the cylindrical housing of round cells and button cells generally consists of two solid, usually metallic housing parts, between which there is arranged an electrically insulating seal. These cells always have exactly one seal region. The situation is different in the latter example of cells. As a result of the presence of the central through-hole or the recess, these cells generally have two or more seal regions. It may thus also be the case that more than one seal is required to seal the cell.

In all examples with the central through-hole or recess, the housing of the cell includes either the through-hole or the recess. The central through-hole is always continuous and, hence, penetrates the housing from one side to the other side and is correspondingly accessible from two sides of the housing. The recess, by contrast, is not continuous. It is accessible only from one side of the housing.

Particularly preferably, the cell has at least one of the following additional features:

The housing takes the form of a hollow cylinder.

The central through-hole or the recess has cylindrical geometry.

The housing comprises two circular ring-shaped housing ends spaced apart from one another and parallel to one another, and a ring-shaped inner housing shell that connects the housing ends and a ring-shaped outer housing shell that connects the housing ends, with each of the housing shells and each of the housing ends having an inside that points into the interior and an outside that points in the opposite direction.

The composite electrode body takes the form of a hollow cylindrical winding formed from electrode tapes and at least one separator tape, and has end faces formed by longitudinal edges of the electrode tapes, in the center of which there is an axial hollow cavity having openings in the center of the end faces.

To achieve the best exploitation of capacity, it is appropriate to match the geometric features of the ring-shaped composite electrode body and of the ring-shaped liquid-impervious housing to one another as well as possible. The composite electrode bodies such as those described, for example, in FIG. 3a and FIG. 3b of WO 2010/089152 A1 are virtually perfect hollow cylinders. These can best exploit the volume of the ring-shaped interior when the interior is likewise in the form of a hollow cylinder.

The through-hole preferably takes the form of a continuous cylindrical hole. The recess preferably takes the form of a cylindrical hole closed at one end.

Preferably, our cell is characterized by at least one of the following additional features:

The cell is a lithium ion cell, especially a secondary lithium ion cell.

At least one of the electrodes of the composite electrode body is a lithium-intercalating electrode.

The composite electrode body has been impregnated with an organic electrolyte with a conductive lithium salt dissolved therein.

The electrodes of a lithium ion cell typically comprise electrochemically active components and electrochemically inactive components.

Useful electrochemically active components (often also referred to as active materials) for secondary lithium ion systems are all materials that can absorb lithium ions and release them again. The state of the art in this regard for the negative electrode is especially carbon-based materials such as graphitic carbon, or non-graphitic carbon materials that are capable of intercalating lithium. In addition, it is also possible to use metallic and semi-metallic materials that can be alloyed with lithium, or composites of such materials with carbon-based materials. Useful materials for the positive electrode especially include lithium-metal oxide compounds and lithium-metal phosphate compounds such as $LiCoO_2$ and $LiFePO_4$.

Electrochemically inactive components primarily include electrode binders and current collectors. The latter serve to form electrical contact over a maximum area with the electrochemically active components. They typically consist of flat metal substrates, for example, metal foils or a metal foam or a metallized nonwoven. The electrode binders ensure the mechanical stability of the electrodes and assure contacting of the particles of electrochemically active material with one another and the current collector. In addition, the term especially also covers conductors, i.e., carbon black, for example.

Conduction of electrons to and away from the electrodes of the composite electrode body is usually via output conductor lugs that can project, for example, beyond the ends of the wound composite body formed. The output conductor lugs are electrically connected to or are part of the current collectors.

The electrochemical cell is in principle not subject to any restriction in terms of its size, including the ratios of the diameters (external diameter/internal diameter) or their height. In some examples in which the housing takes the form of a hollow cylinder, it is preferable, however, that their height exceeds their external diameter by a factor of not more than 2. The height/external diameter ratio may be ≤1.

Further features and advantages that result therefrom will be apparent from the drawings and from the description of the drawings which follows. The examples described hereinafter serve merely for illustration and better understanding and should in no way be regarded as a restriction.

Figure 1B:
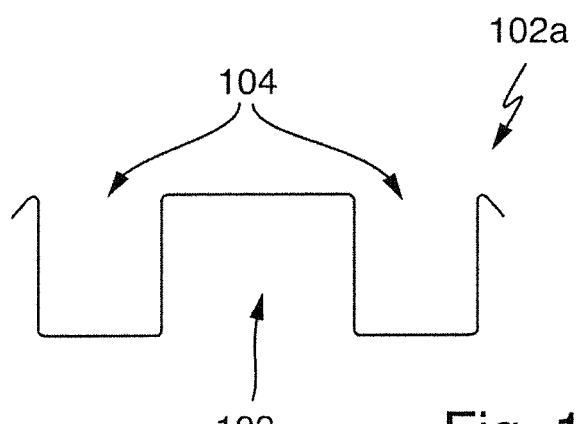
FIGS. 1B and 1C are schematic cross-sectional views of housing parts.
Figure 1C:
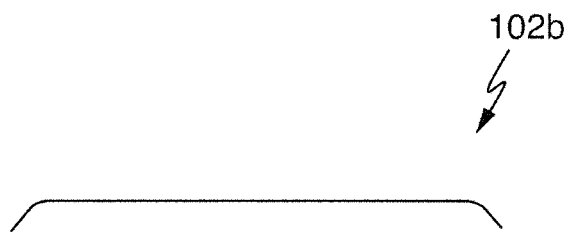
Figure 1D:
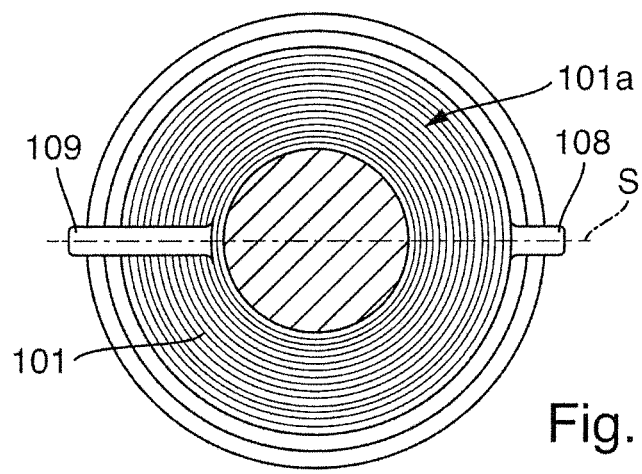
FIG. 1D is a schematic top plan view of a housing part and a composite electrode body.
Figure 1E:
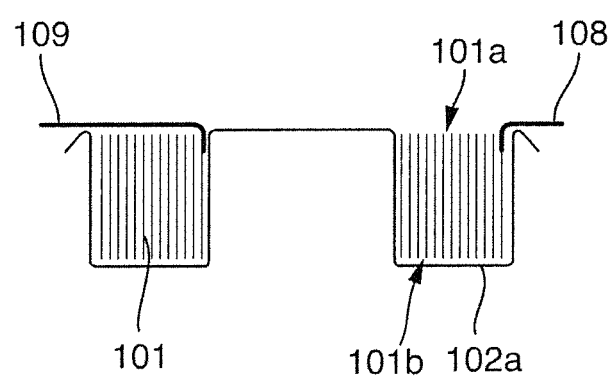
FIG. 1E is a schematic cross-sectional view of the structure of FIG. 1D taken through line S.

FIG. 1A shows one example of an electrochemical cell 100 (schematic cross-sectional diagram). This comprises a ring-shaped composite electrode body 101 and a housing 102 consisting of the housing parts 102a and 102b. The housing parts 102a and 102b are additionally shown separately (FIGS. 1B and 1C, schematic cross-sectional diagram). In addition, FIG. 1D (schematic diagram, top view) and 1E (schematic cross-sectional diagram, section through line S) show the housing part 102a and a composite electrode body 101 used therein.

The ring-shaped composite electrode body 101 is a lithium ion cell impregnated with an organic electrolyte. The composite electrode body 101 takes the form of a hollow cylindrical winding formed from electrode tapes and at least one separator tape, the end faces 101a and 101b of which are formed by longitudinal edges of the electrode tapes.

The housing parts 102a and 102b each consist of a PEEK film having a thickness between 100 and 150 µm. The housing part 102a has two recesses formed by deep drawing, a central cylindrical recess 103 and an outer hollow cylindrical recess 104. The housing part 102b is in the form of a dish.

The housing parts 102a and 102b are joined to one another via the two ring-shaped weld seams 105 and 106. Together they enclose the ring-shaped interior 107 that encloses the composite electrode body 101 in a liquid-impervious manner. The interior 107 is in turn arranged around the recess 103.

The composite electrode body 101 comprises two output conductors 108 and 109 that are electrically connected to one positive and one negative electrode of the composite electrode body 101. The output conductors 108 and 109 are guided out of the interior of the housing 102 to the outside between the two housing parts 102a and 102b.

Although our cells have been described in connection with specific forms thereof, it will be appreciated that a wide variety of equivalents may be substituted for the specified elements described herein without departing from the spirit and scope of this disclosure as described in the appended claims.

The invention claimed is:

1. An electrochemical cell comprising:
a ring-shaped composite electrode body with at least one positive and at least one negative electrode and comprising at least one output conductor electrically connected to the at least one positive electrode of the composite electrode body and at least one output conductor electrically connected to the at least one negative electrode of the composite electrode body;
an electrolyte that impregnates the ring-shaped composite electrode body; and
a ring-shaped housing with a ring-shaped liquid-impervious interior,
wherein the ring-shaped composite electrode body impregnated with the electrolyte is disposed in the interior,
the composite electrode body is ring-shaped,
the ring-shaped housing has an exterior wall comprising an outer circumferential wall and a concentrically arranged inner circumferential wall, wherein the inner circumferential wall of the exterior wall defines a central through-hole or recess around which the ring-shaped interior of the housing is arranged,
the ring-shaped composite electrode body is arranged within the ring-shaped interior,
the housing comprises two housing parts that together form the interior of the housing,
the two housing parts consist of PEK films,
the housing parts are joined to one another via at least one welded or bonded seam, and
the output conductors are guided outwardly of the housing between the two housing parts.

2. The cell according to claim 1, wherein:
the PEK films have a thickness of 50 µm to 500 µm.

3. The cell according to claim 1, comprising at least one of:
a. the ring-shaped housing has at least two spatially separated welded or bonded seams; and
b. the bonded or welded seams each have a ring-shaped profile.

4. The cell according to claim 1, comprising at least one of:
a. the central through-hole or recess has a cylindrical geometry;
b. the ring-shaped housing comprises two circular ring-shaped housing ends spaced apart from one another and parallel to one another, and a ring-shaped inner housing shell that connects the housing ends and a ring-shaped outer housing shell that connects the housing ends, with each of the housing shells and each of the housing ends having an inside that points into the interior and an outside that points in the opposite direction; and c. the ring-shaped composite electrode body is a hollow cylindrical winding formed from electrode tapes and at least one separator tape, and has end faces that are formed by longitudinal edges of the electrode tapes, in the center of which there is an axial hollow cavity having openings in the center of the end faces.

5. The cell according to claim 1, comprising at least one of:

a. the cell is a lithium ion cell;
b. at least one of the electrodes of the ring-shaped composite electrode body is a lithium-intercalating electrode; and
c. the ring-shaped composite electrode body has been impregnated with an organic electrolyte with a conductive lithium salt dissolved therein.

* * * * *